Figure 3:
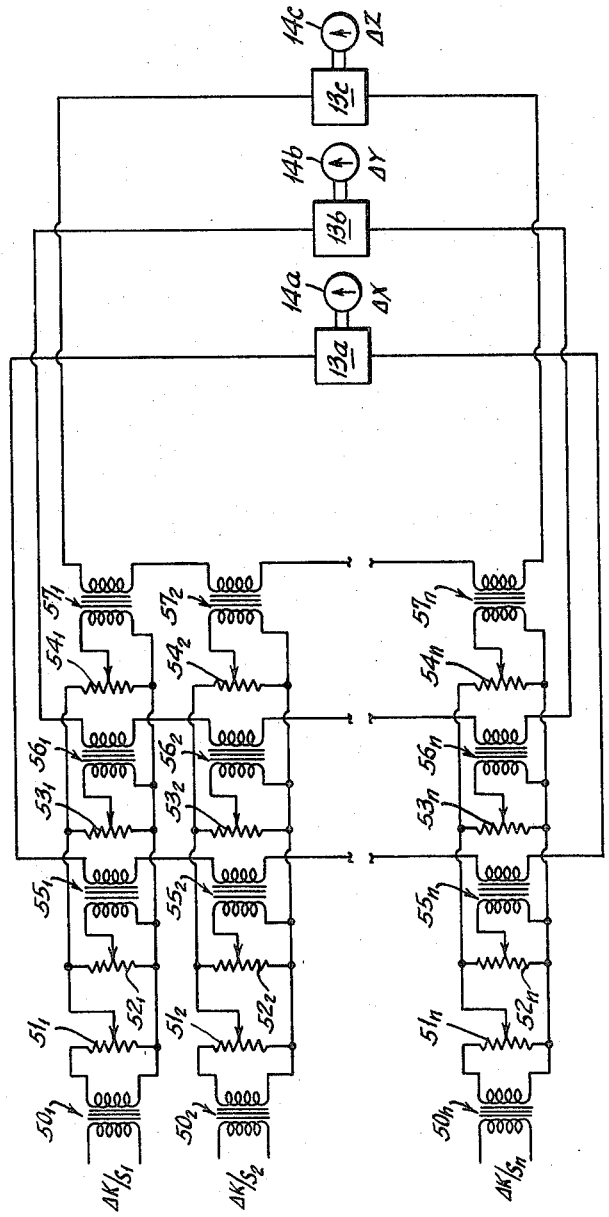

Dec. 1, 1964    H. R. DAVIDSON    3,159,742
TRISTIMULUS DIFFERENCE COMPUTER
Filed June 1, 1961    4 Sheets-Sheet 1
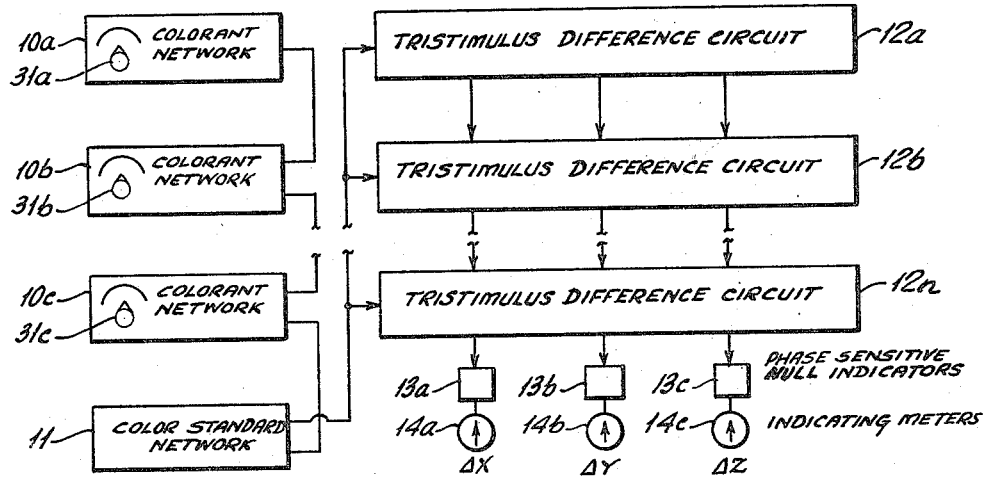
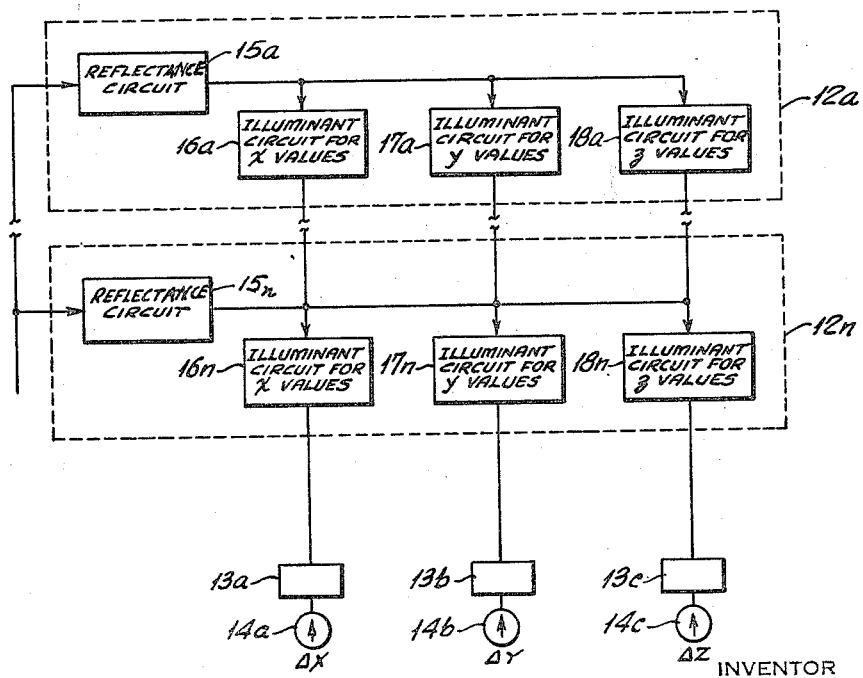
INVENTOR
HUGH R. DAVIDSON
BY
Burgess, Ryan & Hicks
ATTORNEYS

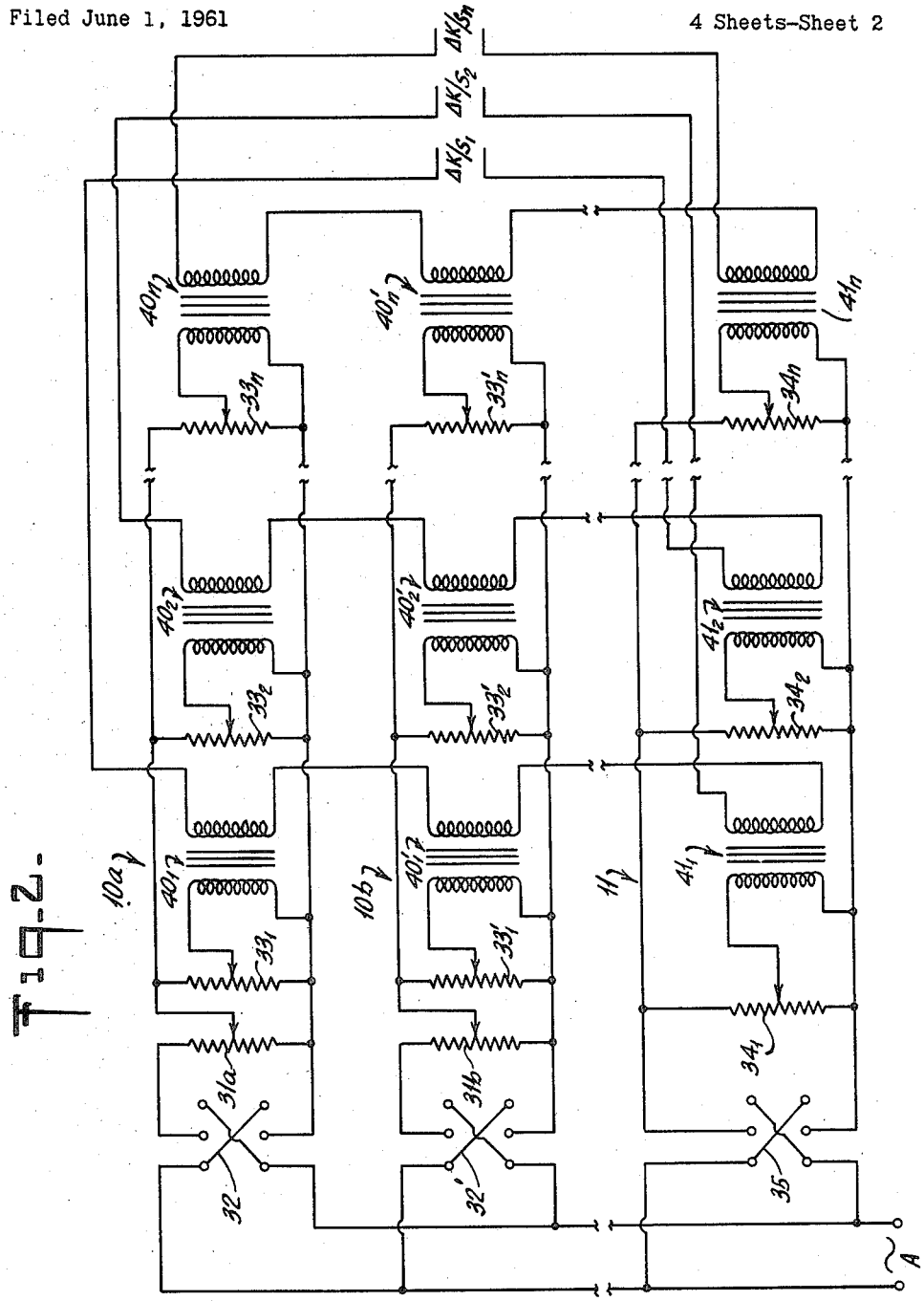

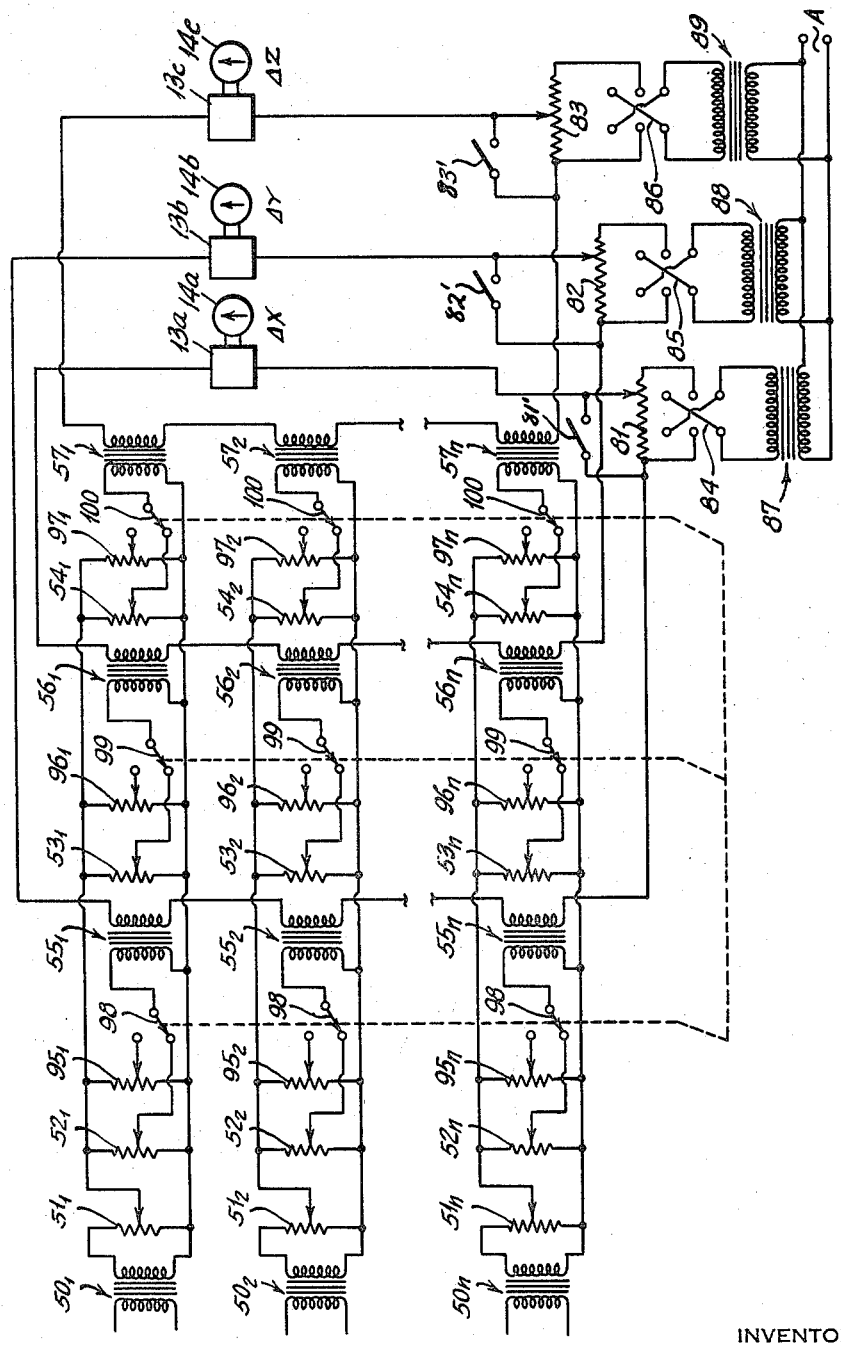

United States Patent Office 3,159,742
Patented Dec. 1, 1964

3,159,742
TRISTIMULUS DIFFERENCE COMPUTER
Hugh R. Davidson, Easton, Pa., assignor to Davidson and Hemmendinger, Easton, Pa., a partnership
Filed June 1, 1961, Ser. No. 114,253
15 Claims. (Cl. 235—184)

The present invention relates to a tristimulus difference computer and relates, more particularly, to an electrical system for determining the amounts of colorants in a mixture which are required to match a color standard under specified conditions of illumination.

The present invention is especially useful in determining the amounts of colorants in a mixture which are required to obtain an acceptable match to a color standard under a specified condition of illumination where the spectrophotometric curves of the colorant mixture and the color standard differ and an exact match cannot be obtained under all conditions of illumination.

An object of the present invention is to provide an electrical system for determining the amounts of selected colorants required in a mixture to obtain a color which will match a given color within acceptable limits under a specified condition of illumination. A further object of the present invention is to provide a system for computing changes in the tristimulus values of a mixture of colorants resulting from changes in the amounts of the respective colorants in the mixture and thus, to determine the changes which are required in the colorants of a mixture to produce a desired change in the tristimulus values of the mixture for a specified condition of illumination. Such a system enables the operator to determine whether the color produced by the mixture will match a color standard within acceptable limits under a specified condition of illumination such as daylight, tungsten light, etc., where the spectrophotometric curves of the mixture and the color standard cannot be matched.

A system embodying the present invention utilizes, in part, and has certain features in common with the system described and claimed in my copending application for United States Letters Patent Serial No. 708,879, filed January 14, 1958, now U.S. Patent No. 3,032,269, for Color Mixture Computer to which reference may be made. Said application relates to a system for determining the amounts of the colorants in a mixture which will produce a color matching a color standard in which the spectrophotometric curves for the color produced and the color standard match. However, matching spectrophotometric curves can only be obtained when the correct colorants and the correct amounts of such colorants are used in the mixture. In other words, spectrophotometric curves can be matched only when a non-metameric match is to be made.

It is not always possible to obtain a non-metameric match; for example, the color standard to be matched may be a piece of paper dyed with acid dyestuffs and the matching color may be required in a piece of plastic in which the dyestuffs used in coloring the paper could not be used. Thus, the colorants required to obtain a non-metameric match may not be available. It may, however, be possible in such a case to obtain a metameric match; that is, a match which a normal observer would consider acceptable under specified conditions of illumination, say, daylight, although it may not be an equally acceptable match under other conditions of illumination. As will be explained hereinafter, the present invention facilitates the selection of the colorants and the determination of the amounts of such colorants in the mixture to obtain a reasonably close match with a color standard for any specified condition of illumination even though the spectrophotometric curves of the sample color and the color standard may differ.

Other objects and advantages of the present invention will be better understood from the following description and the accompanying drawings, in which:

FIG. 1 is a block diagram illustrating a computer system embodying the present invention;
FIG. 1a is a block diagram of a part of the system shown in FIG. 1;
FIG. 2 is a schematic wiring diagram illustrating a part of the system shown in FIG. 1;
FIG. 3 is a schematic wiring diagram illustrating another part of the system shown in FIG. 1; and
FIG. 4 is a schematic wiring diagram illustrating certain modifications in the portion of the system shown in FIG. 3.

Theoretically, when a metameric match must be made; i.e., where the spectrophotometric curves of the color standard the color of the mixture differ, a match may be indicated by tristimulus values for these colors. The tristimulus values X, Y and Z of a given color, which are functions of the distribution of energy in the source of illumination, the reflectance of the color and the tristimulus function of the human eye, may be expressed as follows:

(1) $$X = \int E_c \bar{x} R d\lambda$$
$$Y = \int E_c \bar{y} R d\lambda$$
$$Z = \int E_c \bar{z} R d\lambda$$

Where $E_c$ is the spectral distribution of energy in the standard daylight illuminant C; $\bar{x}$, $\bar{y}$ and $\bar{z}$ are the standard tristimulus functions of the human eye, R is the reflectance of the color standard and all of which values are functions of wave length $\lambda$.

If X, Y and Z are identical for the color standard and the sample color, the colors will match in daylight for a normal observer. If some other source of illumination is used, however, the colors will not, in general, be a match.

In order to calculate the differences $\Delta X$, $\Delta Y$ and $\Delta Z$ between the tristimulus values X, Y and Z of the color standard and of the color sample, Equations 1 may be written as (2) $$\Delta X = \int E_c \bar{x} \Delta R d\lambda$$
$$\Delta Y = \int E_c \bar{y} \Delta R d\lambda$$
$$\Delta Z = \int E_c \bar{z} \Delta R d\lambda$$

where $\Delta R$ is the difference in reflectance between the color standard and the color sample. Thus, when $$\Delta X = \Delta Y = \Delta Z = 0$$

the color standard and the color sample will match under the specified conditions of illumination.

Equations 2 may be further approximated by the following series of equations:

(3) $\Delta X = (E_c \bar{x})_1 \Delta R_1 \Delta \lambda$
$\quad\quad\quad\quad + (E_c \bar{x})_2 \Delta R_2 \Delta \lambda + \ldots (E_c \bar{x})_n \Delta R_n \Delta \lambda$
$\Delta Y = (E_c \bar{y})_1 \Delta R_1 \Delta \lambda$
$\quad\quad\quad\quad + (E_c \bar{y})_2 \Delta R_2 \Delta \lambda + \ldots (E_c \bar{y})_n \Delta R_n \Delta \lambda$
$\Delta Z = (E_c \bar{z})_1 \Delta R_1 \Delta \lambda$
$\quad\quad\quad\quad + (E_c \bar{z})_2 \Delta R_2 \Delta \lambda + \ldots (E_c \bar{z})_n \Delta R_n \Delta \lambda$ where the subscripts refer to wave lengths 1, 2 ... $n$.

Since the values of $(E_c \bar{x})_1$, $(E_c \bar{y})_1$ and $(E_c \bar{z})_1$ and the value of $\Delta \lambda$ are constants, the values of $\Delta X$, $\Delta Y$ and $\Delta Z$ can be determined from these equations.

The Color Mixture Computer described in application Serial No. 708,879 provides output voltages which are proportional to $\Delta K/S_i$, where K is the coefficient of absorption and S is the coefficient of scatter. These output voltages are obtained from the summations which are made at the different wave lengths of light. The following explanation leads to modifications in Equations 3 which permit the use of these output voltages.

The relation between $K/S$ and $R$ may be expressed as follows:

$$(4) \quad K/S_i = \frac{(1-R_i)^2}{2R_i}$$

therefore, by differentation $$(5) \quad dK/S_i = \frac{-1-R_i^2}{2R_i^2} dR_i$$

The following approximation may now be written:

$$(6) \quad \frac{\Delta K/S_i}{\Delta R_i} = \frac{-1-R_i^2}{2R_i^2}$$

or $$(7) \quad \Delta R_i = \frac{-2R_i^2}{1-R_i^2} \Delta K/Si$$

Substituting the values of $R_i$ from Equation 7 in Equation 3 gives the following series of equations:

$$(8)$$

$$\Delta X = (E_c\bar{x})_1 \left(\frac{-2R_1^2}{1-R_1^2}\right) \Delta K/S_1 \Delta\lambda + (E_c\bar{x})_2 \left(\frac{-2R_2^2}{1-R_2^2}\right) \Delta K/S_2 \Delta\lambda + \ldots (E_c\bar{x})_n \left(\frac{-2R_n^2}{1-R_n^2}\right) \Delta K/S_n \Delta\lambda$$

$$\Delta Y = (E_c\bar{y})_1 \left(\frac{-2R_1^2}{1-R_1^2}\right) \Delta K/S_1 \Delta\lambda + (E_c\bar{y})_2 \left(\frac{-2R_2^2}{1-R_2^2}\right) \Delta K/S_2 \Delta\lambda + \ldots (E_c\bar{y})_n \left(\frac{-2R_n^2}{1-R_n^2}\right) \Delta K/S_n \Delta\lambda$$

$$\Delta Z = (E_c\bar{z})_1 \left(\frac{-2R_1^2}{1-R_1^2}\right) \Delta K/S_1 \Delta\lambda + (E_c\bar{z})_2 \left(\frac{-2R_2^2}{1-R_2^2}\right) \Delta K/S_2 \Delta\lambda + \ldots (E_c\bar{z})_n \left(\frac{-2R_n^2}{1-R_n^2}\right) \Delta K/S_n \Delta\lambda$$

It will be noted that in the above equations all values except $\Delta K/S_i$ are constants for a given color standard depending upon the illuminant to be used and the reflectance of the color.

As shown in FIG. 1, a system embodying the present invention includes means for producing output voltages which represent the differences between the spectrophotometric curves for the color standard and the color sample at the wave lengths of light at which a comparison is made. In other words, these output voltages represent $\Delta K/S_i$ (such voltages would be represented on the visual indicating means in application Serial No. 708,879 by the displacement of the several indications from zero) and are obtained by summing the output voltages of the colorant producing networks $10a$, $10b$, $10c$, etc., each of which produces output voltages which are proportional to the amount and the $K/S$ values of one of the colorants at a number of wave lengths and substracting from the sum of such voltages the output voltages from the color network 11 which produces output voltages proportional to the $K/S$ value of the color standard at said wave lengths. The circuits for these networks are described in detail in conjunction with FIG. 2. The combined output voltages from these networks for each wave length ($1 \ldots n$) are, respectively, fed to a series of tristimulus difference circuits $12_a \ldots 12_n$ which convert said voltages to voltages representing the differences $\Delta X$, $\Delta Y$ and $\Delta Z$ between the tristimulus values X, Y and Z for the color standard and the color sample at each of the wave lengths for a specified condition of illumination.

The output voltages representing $\Delta X$, $\Delta Y$ and $\Delta Z$ at one of the wave lengths from each of these networks is combined with the corresponding $\Delta X$, $\Delta Y$ or $\Delta Z$ output voltages from the other networks and the sums of the $\Delta X$, $\Delta Y$ and $\Delta Z$ output voltages are, respectively, applied to null indicators $13_a$, $13_b$ and $13_c$ which drive meters $14_a$, $14_b$ and $14_c$. When each of these meters reads zero, $\Delta X$, $\Delta Y$ and $\Delta Z$ are all equal to zero which indicates that the color standard and the color sample have identical tristimulus values for the specified condition of light and that an acceptable match for the specified conditions of illumination should be obtained.

As shown in FIG. $1a$, each of the computer circuits $12_a \ldots 12_n$ include a reflectance circuit or network $15_a \ldots 15_n$ which produces an output voltage proportional to the difference $\Delta R_i$ in the reflectance between the color standard and the sample color and this voltage is applied to illuminant circuits or networks $16_a$–$16_n$, $17_a$–$17_n$, $18_a$–$18_n$ which modify the voltages applied thereto in accordance with tristimulus values for the specified source of illumination and produce output voltages which are proportional to $\Delta R_i(E_c\bar{x})_i$, $\Delta R_i(E_c\bar{y})_i$, and $\Delta R_i(E_c\bar{z})_i$ and represent the contribution to the different in the tristimulus values between the color standard and the color sample at each of the wave lengths. Thus, the sum of the output voltages from the respective networks $16_a$–$16_n$, $17_a$–$17_n$ and $18_a$–$18_n$ are proportional, respectively, to $\Delta X$, $\Delta Y$ and $\Delta Z$ as shown by Equation 3.

The portion of the system shown in FIG. 2 illustrates a suitable circuit for producing voltages representing the differences between the spectrophotometric curves of the color standard and the color sample at a number of selected waves lengths of light or, in other words, voltages proportional to $\Delta K/S_i$. This circuit, in general, corresponds to a part of the computer system shown in application Serial No. 708,879 with certain modifications having been made to facilitate the use of the output voltages obtained therefrom in the present system. Briefly, this portion of the system includes the networks $10a$, $10b$, etc., for each colorant of the mixture. Each of these networks includes a potentiometer $31a$, $31b$, etc., which may be set to correspond to the amount of the particular colorant in the mixture and which is connected across a source A of alternating current of a constant voltage through a reversing switch 32, 32', etc. A series of resistances $33_1 \ldots 33_n$, $33_1' \ldots 33_n'$, etc., each of which is set to produce a voltage proportional to a function of the reflectance of the particular colorant at each wave length of a series ($1 \ldots n$) of different wave lengths are connected across the outputs of the potentiometers.

It also includes the color standard network 11 which produces an output voltage which is proportional to a function of the reflectance of the color standard at each of the wave lengths of the series of wave lengths. This network includes a series of potentiometers $34_1$, $34_2 \ldots 34_n$ which are connected through a reversing switch 35 to the source A of alternating current and are set to produce output voltages which are proportional to a function of the reflectances of the color standard at the respective wave lengths of the series of wave lengths.

The outputs from the resistances in the colorant networks are respectively connected to the primaries of output transformers $40_1 \ldots 40_n$, $40_1' \ldots 40_n'$, etc. The secondaries of said output transformers for the respective wave lengths are connected in series to obtain the sum of the output voltages from the colorant circuits for each wave length. The outputs from the potentiometers in the color standard network are also connected, respectively, to the primaries of output transformers $41_1 \ldots 41_n$ and the secondaries of these transformers are connected, respectively, in series with the secondaries of the transformers for the colorant networks, but with the output voltages for the color network being out of phase by 180° with respect to the combined output voltages from the colorant networks so that said voltages act to cancel each other to the extent that they are equal. In other words, these voltages are summed with the voltage from the color standard network being opposite in sign to the combined voltages from the colorant networks at each wave length.

As previously mentioned, differences may, and generally will, exist between the combined output voltages of colorant networks and the output voltage of the standard color network because the predicted color of a mixture of the proposed amounts of the selected colorants and the color standard differ. Thus, as explained above, the combined output voltages at the different wave lengths are proportional to the difference between the spectrophotometric curves of the color sample and the color standard and thus, are proportional to $\Delta K/S_1$, $\Delta K/S_2$ ... $\Delta K/S_n$ (or $K/S_i$).

The output voltages obtained from the circuits shown in FIG. 2 are employed in the circuits shown in FIG. 3 to compute the values of the differences $\Delta X$, $\Delta Y$ and $\Delta Z$ of the tristimulus values of the color standard and the color sample on the basis of the Equations 8. The system shown in FIG. 3 includes a series of circuits which are respectively connected to the outputs of each of the circuits shown in FIG. 2 for the different wave lengths. Each of these circuits is arranged to produce output voltages which when summed together are proportional to $\Delta X$, $\Delta Y$ and $\Delta Z$ for a specified condition of illumination and includes a transformer $50_1$, $50_2$ ... $50_n$, the primary of which is connected to the output of one of the circuits shown in FIG. 2.

Potentiometers $51_1$, $51_2$ ... $51_n$ which are set to values proportional to $$\frac{-2R_i^2}{1-R_i^2}$$

are connected across the secondary of the transformer. The output from the potentiometer in each circuit which is proportional to $\Delta R_i$ (see Equation 7) is connected across potentiometers $52_1$, $52_2$ ... $52_n$, $53_1$, $53_2$ ... $53_n$ and $54_1$, $54_2$ ... $54_n$ which are set to values which are proportional, respectively, to $(E_c\bar{x})_i$ $(E_c\bar{y})_i$ and $(E_c\bar{z})_i$. The outputs from these potentiometers are proportional, respectively, to $\Delta R_i(E_c\bar{x})_i$; $\Delta R_i(E_c\bar{y})_i$ and $\Delta R_i(E_c\bar{z})_i$ and are connected to the primaries of transformers 55, 56 and 57, respectively.

The secondaries of the corresponding transformers in the circuits for the various wave lengths are connected in series to sum the output voltages and thus, provide output voltages which are proportional to the difference in tristimulus values $\Delta X$, $\Delta Y$ and $\Delta Z$ between the color standard and the color sample, as per Equation 3. Each of the output voltages representing the tristimulus differences is connected to one of the phase sensitive null indicators $13_a$, $13_b$ or $13_c$ which are, in turn, connected to the meters $14_a$, $14_b$ and $14_c$ which, respectively, indicate the value and sign of the tristimulus differences of $\Delta X$, $\Delta Y$ and $\Delta Z$. An example of a suitable phase sensitive null indicating device is described in an article entitled "The Ring Modulator as a Polarized Rectifier," by A. J. Hermont, A.I.E.E. Transactions, March 1955, pp. 21–30.

In operation of the system, the following procedure may be followed:

(1) The values of $K/S$ for the color standard at the different wave lengths are set on the potentiometers in the color standard network shown in FIG. 2. (NOTE.—The settings of the potentiometers in the colorant networks will be of no significance at this time and will be adjusted later.)

(2) Appropriate values of $$\frac{-2R_i^2}{1-R_i^2}$$

are set on the potentiometers which are connected to the secondaries of the transformers in the tristimulus difference circuits.

(3) Appropriate values of $E_c\bar{x}$, $E_c\bar{y}$ and $E_c\bar{z}$ are set, respectively, on the three other potentiometers in the tristimulus difference circuits.

(4) The potentiometers in the colorant circuits are now adjusted until the meters connected to the outputs of the tristimulus difference circuits each indicates a null or zero voltage. If such a null condition can be reached for the colorants used, the tristimulus differences $\Delta X$, $\Delta Y$ and $\Delta Z$ are all equal to zero and a color match for the particular source or condition of illumination $E_c$ is predicted regardless of the fact that a spectrophotometric match may not be possible.

Several possible modifications are shown in FIG. 4. One modification is that the output voltages, representing $\Delta X$, $\Delta Y$ and $\Delta Z$, from the tristimulus difference circuits are connected, respectively, to the null indicators through potentiometers 81, 82 and 83 which are connected, respectively, through reversing switches 84, 85 and 86 and transformers 87, 88 and 89 to the source A of alternating current. The reversing switches are positioned so that the voltages from the potentiometers will be opposite in phase to the $\Delta X$, $\Delta Y$ and $\Delta Z$ voltages. Under these conditions, the voltages from the potentiometers will oppose the output voltages from the tristimulus difference circuits which represent $\Delta X$, $\Delta Y$ and $\Delta Z$ and will be equal in magnitude to such voltages when the meters are at zero. Thus, direct readings of the tristimulus difference values $\Delta X$, $\Delta Y$ and $\Delta Z$ can be obtained by calibration of the potentiometer dials. In this connection, it will be noted that the reversing switches enable the phase of the output voltage of the potentiometers to be reversed since the voltages representing the tristimulus differences $\Delta X$, $\Delta Y$ and $\Delta Z$ may have either positive or negative values. Switches 81', 82' and 83' may be provided so that the balancing potentiometers 81, 82 and 83 may be connected in the circuit when desired.

This modification may also be used in cases where it is desired that $\Delta X$, $\Delta Y$ and $\Delta Z$ should have some value other than zero. For example, a color correction may be desired after an approximate match to a color standard has been made. The difference in tristimulus values between the sample and the standard may be placed on the potentiometers and then the concentration potentiometers in the colorant networks can be adjusted until the meters show a null. The settings of the concentration dials will then show the appropriate correction to the colorant mixture. In this connection, it should also be noted that this arrangement also makes it unnecessary to obtain $K/S$ values for either the color standard or the sample and the required correction to the mixture or batch can be determined rapidly even where non-metameric matches are involved.

A further modification shown in FIG. 4 enables the match which has been obtained to be compared for different conditions of illumination. For this purpose second potentiometers $95_1-95_n$, $96_1-96_n$ and $97_1-97_n$ is provided in each of the illuminant networks of the tristimulus difference circuits. In addition, switches 98, 99 and 100 are provided for selectively connecting said second potentiometers or the first potentiometers (which are set to the $E_c\bar{x}_i$, $E_c\bar{y}_i$ and $E_c\bar{z}_i$ values, as previously mentioned) in the tristimulus difference circuits. These switches are preferably coupled together, as indicated, and the second potentiometers are, respectively, set to values which are proportional to $E_A\bar{x}_i$, $E_A\bar{y}_i$ and $E_A\bar{z}_i$ where $E_A$ represents the energy distribution of second source of illumination.

Such an arrangement facilitates the selection of optimum pigments or colorants for the mixture. When a metameric match is to be made, it can normally be made in a number of different ways; i.e., with different combinations or quantities of pigments or colorants. Each of these matches may be equally good for a normal observer in standard daylight and the optimum combination would then be defined as the one which is best for a normal observer viewing the sample in some other illuminant, for instance, tungsten illumination. When used in this manner, the computer is first set up to determine the amounts or proportions of a particular set of colorants which are required to obtain a match in the primary illuminant, say, daylight. Under these conditions, the potentiometers 81, 82 and 83 in the balancing circuits will be set at zero. The switches 98, 99 and 100 are then changed to connect the second potentiometers in the tristimulus difference circuits and predicted values of the error in the tristimulus values for the second source of illumination may then be obtained by adjusting the settings of balancing potentiometers to bring the meters to zero readings. If the indicated errors appear to be too great, the same procedure can be repeated for other selections or combinations of colorants until the error is reduced and the best formulation leading to the least error in predicted tristimulus values has been determined.

It will be understood that various other modifications and changes may be made in the embodiments of the invention which has been illustrated and described herein without departing from the scope or spirit of the invention as defined by the following claims.

I claim:

1. A system for establishing the amounts of colorants required in a mixture to produce a color corresponding to a given color under specified conditions of illumination which comprises means for producing a voltage representing a difference between the spectrophotometric curves of a given color and a color produced by a mixture containing a number of colorants, means for converting said voltage into voltages representing differences in tristimulus values between the given color and the color produced by the mixture of colorants under specified conditions of illumination, and means for indicating the differences in tristimulus values between the color and the color produced by the mixture of colorants for each tristimulus function.

2. A system for establishing the amounts of colorants required in a mixture to produce a color corresponding to a given color under specified conditions of illumination which comprises means for producing voltages representing differences between the spectrophotometric curves of a given color and a color produced by a mixture of colorants at a number of different wave lengths of light, means for converting said voltages into voltages representing differences in tristimulus values between the given color and the color produced by the mixture of colorants under specified conditions of illumination, and means for indicating when the tristimulus values of the color and the tristimulus values of the color produced by the mixture of colorants for each tristimulus function are equal.

3. A system for establishing the amounts of colorants required in a mixture to produce a color corresponding to a given color under specified conditions of illumination as defined in claim 2 wherein the means for indicating when the voltages representing the tristimulus values of the color and the tristimulus values of the color produced by the mixture of colorants are equal includes a phase-sensitive null indicator and a meter for each tristimulus function.

4. A system for establishing the amounts of colorants required in a mixture of colorants to produce a color corresponding to a given color under specified conditions of illumination as defined in claim 2 wherein the means for converting the voltages representing the differences in the spectrophotometric curves of the color and the color produced by the mixture of colorants into voltages representing the differences in tristimulus values includes a network for each of the different wave lengths of light and circuits for summing the output voltages of the networks for each tristimulus function.

5. A system for establishing the amounts of colorants required in a mixture of colorants to produce a color corresponding to a given color under specified conditions of illumination as defined in claim 2 wherein the means for converting the voltages representing the differences in the spectrophotometric curves of the color and the color produced by the mixture of colorants into voltages representing the differences in tristimulus values includes a network for each of the different wave lengths of light each of said networks comprising an adjustable resistance which is set to produce an output voltage proportional to the difference in reflectance between the given color and the color produced by the mixture of colorants and a series of adjustable resistances connected to the output of the first-mentioned resistance, each of said series of resistances being set, respectively, at values representing the energy distribution for the specified condition of illumination and one of the tristimulus functions; and circuits for summing the output voltages of the networks for each tristimulus function.

6. A system for establishing the amounts of colorants required in a mixture to produce a color corresponding to a given color under specified conditions of illumination as defined in claim 2 wherein the means for producing voltages representing the differences between the spectrophotometric curves of the color and the color produced by the mixture of colorants includes a voltage producing network for each of the colorants in the mixtures and each of said networks includes a resistance element which is adjustable to provide a voltage which is proportional to the amount of one of the colorants in the mixture.

7. A system for establishing the amounts of colorants to be used in a mixture to produce a color corresponding to a given color under specified conditions of illumination as defined in claim 2 which includes means for producing voltages representing the differences in tristimulus values between the given color and the color produced by the mixture of colorants under different conditions of illumination, and means for selectively connecting said last-mentioned means in the system.

8. A system for establishing the amounts of colorants required in a mixture to produce a color which matches a given color under specified conditions of illumination which comprises means for producing voltages representing differences between the spectrophotometric curves of a given color and a color produced by a mixture of colorants at a number of wave lengths of light, means for converting said voltages into voltages representing differences in tristimulus values between the given color and the color produced by the mixture of colorants under specified conditions of illumination, means for indicating visually the voltages representing the said differences in tristimulus values, and means for establishing the values of the differences between the tristimulus values of the color and the color produced by the mixture of colorants.

9. A system for establishing the amounts of colorants required in a mixture to produce a color corresponding to a given color under specified conditions of illumination which comprises means for producing voltages representing differences between the spectrophotometric curves of a given color and a color produced by a mixture of colorants at a number of different wave lengths of light, means for converting said voltages into voltages representing differences in tristimulus values between the given color and the color produced by the mixture of colorants at each of said different wave lengths of light under specified conditions of illumination, means for summing the voltages representing said differences for the respective tristimulus values at the different wave lengths of light, and means for indicating the difference in tristimulus values between the color and the color produced by the mixture for each of the tristimulus functions.

10. A system for establishing the amounts of colorants required in a mixture to produce a color corresponding to a given color under specified conditions of illumination which comprises means for producing voltages representing differences between the spectrophotometric curves of a given color and a color produced by a mixture of colorants at a number of different wave lengths of light, means for converting said voltages into voltages representing differences in tristimulus values of the given color and the color produced by the mixture of colorants at each of said different wave lengths of light under specified conditions of illumination, means for summing the voltages representing said differences in the tristimulus values of the given color and the color produced by the mixture of colorants for each tristimulus function, and means for indicating visually when the tristimulus values of the color and the tristimulus values of the color produced by the mixture of colorants are equal.

11. In a system for establishing the amounts of colorants in a mixture containing the colorants to produce a color corresponding to a given color under specified conditions of illumination, the combination which comprises a network for producing voltages representing the difference in tristimulus values between a given color and a color produced by a mixture of colorants under specified conditions of illumination, said network including a resistance element which is set to produce a voltage which is proportional to the difference in reflectance between the given color and the color produced by the mixture of colorants and resistance elements which are set, respectively, to provide voltages which are proportional to the distribution of energy in a specified source of illumination and one tristimulus function.

12. In a system for establishing the amounts of colorants required in a mixture containing the colorants to produce a color corresponding to a given color under specified conditions of illumination, the combination as defined in claim 11 which includes means for indicating the value and sign of the output voltages from said network.

13. In a system for establishing the difference in tristimulus values between a color standard and a color sample made from a mixture of colorants, the combination comprising a plurality of networks, each of which produces output voltages which are proportional to differences between the tristimulus values of a color standard and a color made from a color produced by a mixture of colorants under specified conditions of illumination at a different wave length of light, circuits for summing the output voltages of said network for each of the tristimulus values, and means for indicating the value and sign of the sum of said voltages for each tristimulus function.

14. In a system for establishing the difference in tristimulus values between a color standard and a color sample made from a mixture of colorants, the combination comprising a plurality of circuits, each of which produces output voltages which are proportional to differences between the tristimulus values of a color standard and a color made from a color produced by a mixture of colorants under specified conditions of illumination at a different wave length of light, circuits for summing the output voltages of said networks for each tristimulus function, and means for indicating when the tristimulus values of the color and the color produced by a mixture of colorants are equal, said indicating means including a phase-sensitive null indicator and a meter for each tristimulus function.

15. In a system for establishing the difference in tristimulus values between a color standard and a color sample made from a mixture of colorants, the combination as defined in claim 14, which further includes means connected to the phase-sensitive null indicator for supplying voltages thereto in opposition to the sum of the output voltages from the networks, said last-mentioned means including adjustable potentiometers which are connected to a source of constant voltage through transformers and reversing switches.

References Cited in the file of this patent
UNITED STATES PATENTS

| | | |
|---|---|---|
| 2,540,797 | Stearns | Feb. 6, 1951 |
| 2,540,798 | Stearns | Feb. 6, 1951 |
| 2,542,564 | Park | Feb. 20, 1951 |
| 2,950,862 | Bubb | Aug. 30, 1960 |
| 2,965,703 | Loughlin | Dec. 20, 1960 |
| 3,018,050 | Barrell | Jan. 3, 1962 |

OTHER REFERENCES

Rose: "Electronic Computer for Color Printing," Communication and Electronics, Trans. of the A.I.E.E., vol. 74, No. 18, part 1, May 1955, pages 268 to 272.

Burr et al.: "Simple Color Computer Gives Tristimulus Values," Electronics, October 1955, pages 166 to 169.

UNITED STATES PATENT OFFICE
CERTIFICATE OF CORRECTION

Patent No. 3,159,742                                December 1, 1964

Hugh R. Davidson

It is hereby certified that error appears in the above numbered patent requiring correction and that the said Letters Patent should read as corrected below.

Column 2, line 16, after "standard" insert -- and --; column 3, line 5, for "differentation" read -- differentiation --; line 17, before "$R_i$" insert -- $\Delta$ --; column 4, line 5, for "different" read -- difference --; line 31, for "of", first occurrence, read -- in --; column 5, line 8, for "(or $K/S_i$)" read -- (or $\Delta K/S_i$) --; column ., line 75, after "light" insert a comma; column 8, lines 19 and 20, for "mixtures" read -- mixture --; column 9, line 10, before "in" insert -- required --; column 10, line 12, for "a" read -- the --; line 35, for "Jan. 3, 1962" read -- Jan. 23, 1962 --.

(SEAL)            Signed and sealed this 20th day of April 1965.

Attest:

ERNEST W. SWIDER                            EDWARD J. BRENNER
Attesting Officer                                    Commissioner of Patents